US012709580B2

(12) United States Patent
Gautier

(10) Patent No.: US 12,709,580 B2
(45) Date of Patent: Aug. 18, 2026

(54) FIBROUS PREFORM OF A FRICTION PART

(71) Applicant: SAFRAN LANDING SYSTEMS, Velizy-Villacoublay (FR)

(72) Inventor: Patrice Gautier, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 807 days.

(21) Appl. No.: 17/628,486

(22) PCT Filed: Jul. 30, 2020

(86) PCT No.: PCT/FR2020/051407

§ 371 (c)(1),
(2) Date: Jan. 19, 2022

(87) PCT Pub. No.: WO2021/028629

PCT Pub. Date: Feb. 18, 2021

(65) Prior Publication Data

US 2022/0250993 A1 Aug. 11, 2022

(30) Foreign Application Priority Data

Aug. 12, 2019 (FR) ...................................... 1909163

(51) Int. Cl.
*C04B 35/83* (2006.01)
*C04B 41/45* (2006.01)
(Continued)

(52) U.S. Cl.
CPC .......... *C04B 35/83* (2013.01); *C04B 41/4501* (2013.01); *F16D 65/125* (2013.01); *F16D 65/127* (2013.01); *F16D 69/023* (2013.01); *C04B 2235/3244* (2013.01); *C04B 2235/3826* (2013.01); *C04B 2235/5248* (2013.01); *C04B 2235/5252* (2013.01); *C04B 2237/38* (2013.01); *C04B 2237/582* (2013.01);
(Continued)

(58) Field of Classification Search
CPC ...................................................... C04B 35/83
See application file for complete search history.

(56) References Cited

U.S. PATENT DOCUMENTS 5,753,570 A 5/1998 Garrigus
5,766,060 A * 6/1998 Foreman ................ B24D 13/10
451/63

(Continued)

FOREIGN PATENT DOCUMENTS

| | | | |
|---|---|---|---|
| CN | 104918773 A | 9/2015 |
| FR | 2 880 016 A1 | 6/2006 |
| WO | WO 97/20092 A1 | 6/1997 |

OTHER PUBLICATIONS

International Search Report as issued in International Patent Application No. PCT/FR2020/051407, dated Nov. 6, 2020.

*Primary Examiner* — Andrew T Piziali
(74) *Attorney, Agent, or Firm* — CUSHMAN PARTNERS, LLC

(57) ABSTRACT

A fibrous preform for forming the fibrous reinforcement of a friction part made of composite material, includes a woven helical fibrous texture defining a superposition of fibrous layers, the texture being needled and having ceramic particles selectively at areas intended to define the rubbing faces of the friction part.

8 Claims, 3 Drawing Sheets

(51) Int. Cl.
*F16D 65/12* (2006.01)
*F16D 69/02* (2006.01)

(52) U.S. Cl.
CPC ................ *F16D 2200/0039* (2013.01); *F16D 2200/006* (2013.01); *F16D 2200/0086* (2013.01)

(56) References Cited

U.S. PATENT DOCUMENTS

2002/0176990 A1* 11/2002 Johnson ............ C04B 35/62839
428/408
2003/0034113 A1 2/2003 Butler et al.
2004/0192534 A1 9/2004 Nixon et al.
2008/0131621 A1* 6/2008 Lineton ................... C23C 24/10
427/556
2009/0078514 A1* 3/2009 Baud ................. C04B 35/62889
188/218 XL
2010/0001231 A1* 1/2010 Loukus ................. C04B 41/009
249/105
2015/0314553 A1 11/2015 Desjoyeaux et al.
2019/0203789 A1* 7/2019 Ng ........................ F16D 65/127

* cited by examiner

[Fig. 1]
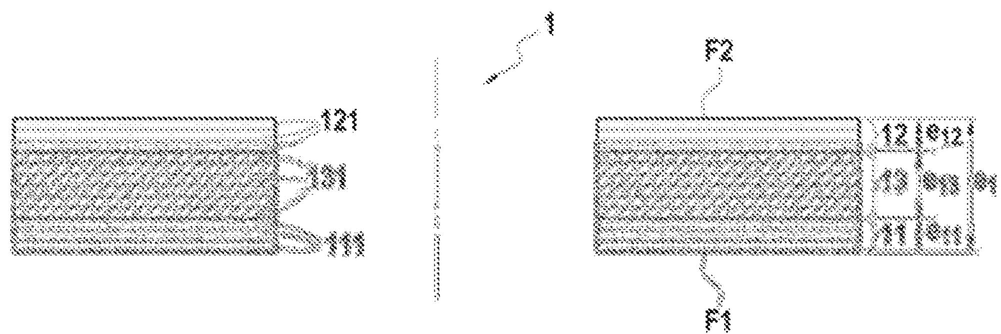
[Fig. 2]
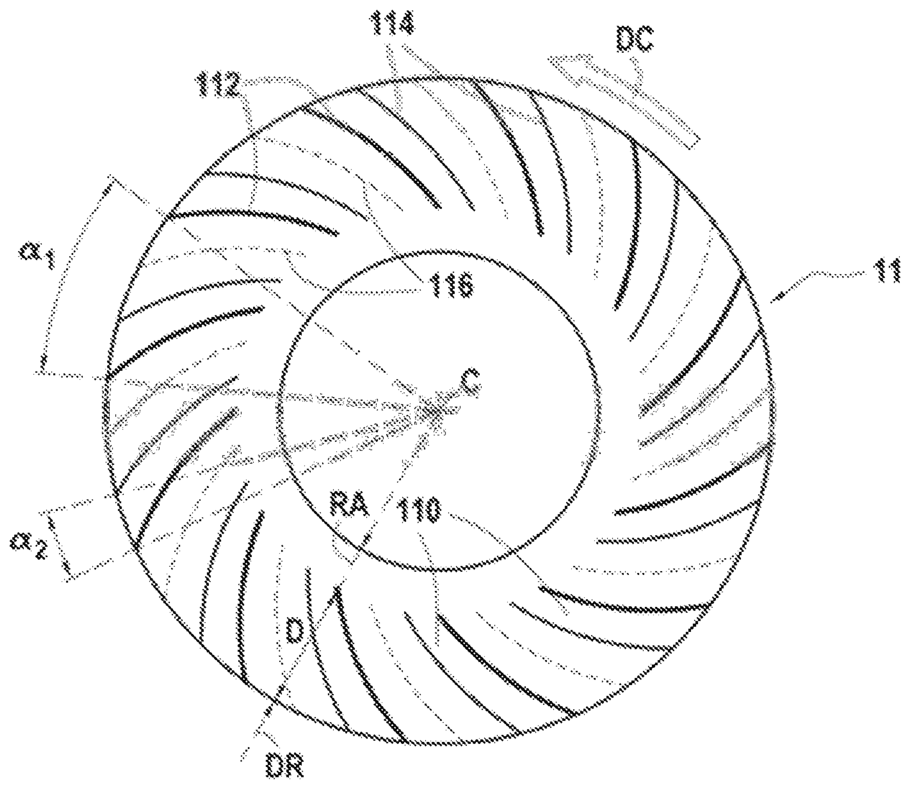

[Fig. 3]
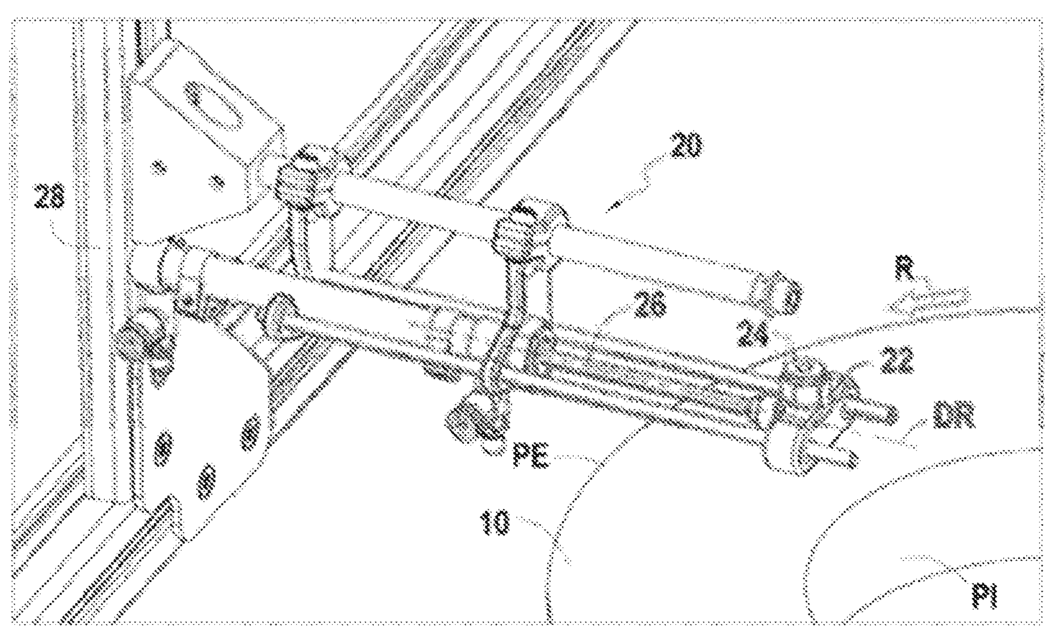
[Fig. 4]
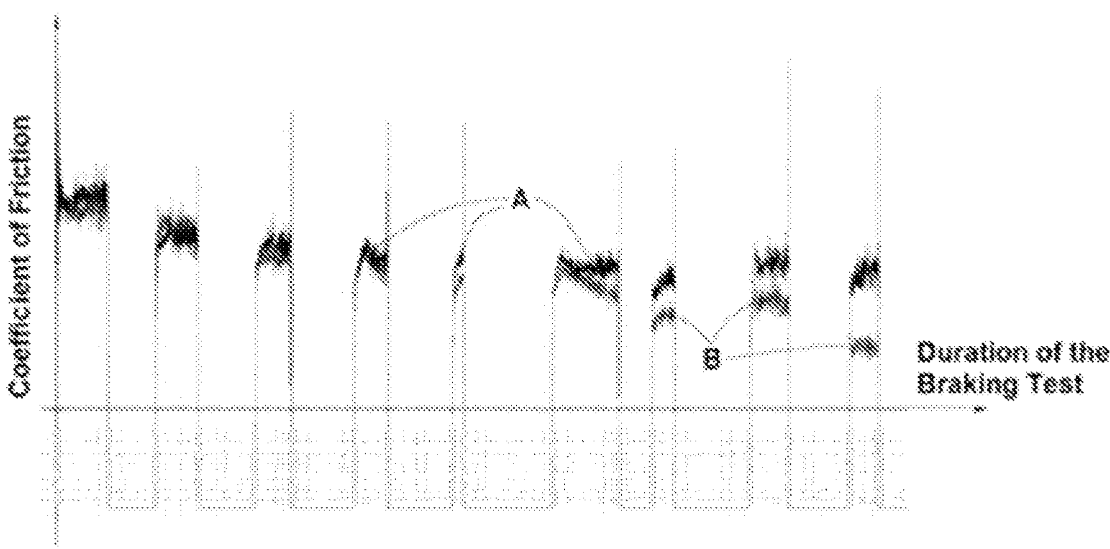

[Fig. 5]
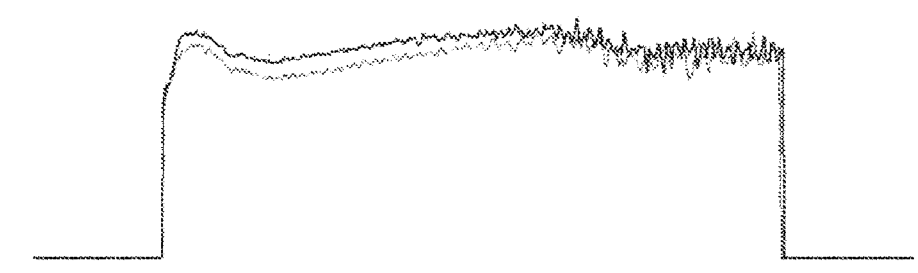

FIBROUS PREFORM OF A FRICTION PART

CROSS-REFERENCE TO RELATED APPLICATIONS

This application is the U.S. National Stage of PCT/FR2020/051407, filed Jul. 30, 2020, which in turn claims priority to French patent application number 1909163 filed Aug. 12, 2019. The content of these applications are incorporated herein by reference in their entireties.

TECHNICAL FIELD

The present invention relates to a fibrous preform for forming the fibrous reinforcement of a friction part comprising a woven helical fibrous texture, said texture being needled and having ceramic particles selectively at areas intended to define the rubbing faces of the friction part. The invention also relates to the manufacturing process of such a fibrous preform.

PRIOR ART

It is desirable to have parts for friction applications with good hot and cold braking properties. To improve cold performance, ceramic particles can be introduced into the fibrous preform after its manufacture but, in this case, it is sought to not degrade too much the hot braking performances. The invention aims to improve the compromise between hot and cold braking performances of friction parts.

DISCLOSURE OF THE INVENTION

The present invention relates to a fibrous preform for forming the fibrous reinforcement of a friction part made of composite material, comprising a woven helical fibrous texture defining a superposition of fibrous layers, said texture being needled and defining:

- a first portion and a second portion each intended to define a distinct rubbing face of the friction part and each comprising at least one fibrous layer comprising ceramic particles, and
- an intermediate portion between the first portion and the second portion and comprising at least one fibrous layer, said intermediate portion being devoid of ceramic particles.

In the present invention, the ceramic particles are selectively present at the first and second portions corresponding to the areas intended to form the rubbing faces of the friction part. The ceramic particles are not present in the intermediate portion. The presence of ceramic particles near the rubbing faces allows improving the cold braking performance of the friction part. The absence of the ceramic particles in the intermediate portion helps to strengthen the material and improve the hot braking properties of the friction part compared to when the ceramic particles are homogeneously present throughout the fibrous preform. The fibrous preform described above thus allows providing a friction part with better compromise between the cold braking properties and the hot braking properties. The absence of ceramic particles in the intermediate part has the additional advantage of facilitating machining for drilling cooling holes in the friction part.

In an exemplary embodiment, the ceramic particles are discontinuously present on the surface of the fibrous layers of the first and second portions.

In this case, areas with ceramic particles and areas without ceramic particles on the rubbing faces are alternating. This further improves the compromise between the cold braking properties and the hot braking properties of the friction part.

In an exemplary embodiment, the first and second portions each comprise a first fibrous layer having first areas in which the ceramic particles are present, and a second fibrous layer, superimposed on the first fibrous layer, having second areas in which the ceramic particles are present, the second areas not covering the first areas.

In this case, there is an offset between the positions of the ceramic particles in different superimposed layers of the first and second portions. This avoids any risk of corrugation of the fibrous preform.

In an exemplary embodiment, the ceramic particles are present in areas extending along a radial direction of the fibrous layers of the first and second portions.

The invention also relates to a friction part made of composite material comprising a fibrous preform as described above, and a matrix present in the porosity of the fibrous preform.

In an exemplary embodiment, the friction part is a brake disc.

The friction part can be made of a carbon/carbon composite material with the fibrous preform formed of carbon yarns, and a carbon matrix densifying the porosity of the preform.

The present invention also relates to a manufacturing method of a fibrous preform as described above, comprising at least:

- needling a first part of a woven helical fibrous web to form the first portion of the fibrous texture, wherein ceramic particles are distributed on said first part during said needling,
- needling an intermediate part of the woven helical fibrous web to form the intermediate portion of the fibrous texture, said intermediate part being superimposed on the first part and the distribution of the ceramic particles being interrupted during said needling, and
- needling a second part of the woven helical fibrous web to form the second portion of the fibrous texture, said second part being superimposed on the intermediate part and ceramic particles being distributed on said second part during said needling.

The ceramic particles are introduced during the needling of the fibrous preform by depositing the ceramic particles at the layer(s) intended to form the first and second portions and by interrupting this deposition of ceramic particles during the needling of the layer(s) intended to form the intermediate portion.

In an exemplary embodiment, the ceramic particles are discontinuously distributed on the surface of the fibrous layers of the first and second portions of the woven helical fibrous web.

This characteristic allows obtaining a discontinuous presence of ceramic particles on the surface of the fibrous layers of the first and second portions as described above.

In an exemplary embodiment, when needling each of the first and second portions of the woven helical fibrous web, the following is carried out:

- needling a first fibrous layer during which ceramic particles are discontinuously deposited in first areas on the surface of the first fibrous layer, and
- needling a second fibrous layer, superimposed on the first fibrous layer, during which the ceramic particles are discontinuously deposited in second areas on the surface of the second fibrous layer, the second areas not covering the first areas.

This characteristic allows obtaining an offset between the positions of ceramic particles present in different superimposed layers of the first and second portions as described above.

In an exemplary embodiment, the ceramic particles are distributed by a moving distribution system along a radial direction of the fibrous layers of the first and second parts.

This characteristic allows obtaining ceramic particles present in areas extending along a radial direction of the fibrous layers of the first and second portions as described above.

BRIEF DESCRIPTION OF THE DRAWINGS

FIG. 1 schematically illustrates a section of an exemplary fibrous preform according to the present invention.

FIG. 2 illustrates, schematically, the distribution of ceramic particles within different superimposed layers dose to a rubbing face in the fibrous preform in FIG. 1.

FIG. 3 illustrates a portion of an example of a needling machine suitable for manufacturing a fibrous preform according to the present invention.

FIG. 4 is an experimental result comparing the braking performances of an exemplary friction part according to the present invention with those of a friction part outside of the invention.

FIG. 5 is an experimental result comparing the braking performances of an exemplary friction part according to the present invention with those of a friction part outside of the invention.

DESCRIPTION OF THE EMBODIMENTS

FIG. 1 illustrates an exemplary fibrous preform 1 according to the present invention for forming the fibrous reinforcement of a friction part. The considered friction part is here a brake disc, in particular a brake disc made of carbon/carbon composite material for vehicle brakes, and in particular for a racing automobile. However, the present invention remains applicable to other friction parts such as brake discs for aircraft.

The fibrous preform 1 is obtained by needling a woven helical fibrous web. The woven helical fibrous web can be obtained by three-dimensional or two-dimensional weaving of yarns. The fibrous preform 1 can be formed of carbon fiber yarns. The fibrous preform 1 comprises several fibrous layers 111, 131 and 121 superimposed and needled to each other. The fibrous layers 111, 131 and 121 initially define a single helical fibrous web that has been needled to form the fibrous preform L Needling is a mechanical bonding method known per se in which a fibrous structure is crossed by barbed needles to which the fibers are hung. This results in a transfer of fibers from one fibrous layer to another in a direction transverse to these fibrous layers, thus creating mechanical bonds between the fibrous layers 111, 131 and 121. The fibrous preform 1 may have an annular shape, such as illustrated, FIG. 1 shows a section taken along the thickness of the fibrous preform 1.

As indicated above, the fibrous preform 1 comprises ceramic particles, which are only present on the side of the areas intended to define the rubbing faces F1 and F2 of the friction part. In other words, the ceramic particles are selectively located on the side of the areas intended to define the rubbing faces F1 and F2 of the friction part and are not present in the central part of the fibrous preform. The fibrous preform 1 does not have a homogeneous distribution of the ceramic particles along its thickness.

The fibrous preform 1 thus includes a first portion 11 and a second portion 12, opposite to the first portion 11, which are each intended to define a separate rubbing face F1 or F2 of the friction part and each including ceramic particles. The first 11 and second 12 portions are surface portions of the fibrous preform 1. The first portion 11 may be located in the lower part of the fibrous preform 1 and the second portion 12 in the upper part of the fibrous preform 1. The ceramic particles contained in the first portion 11 may be identical or different from those contained in the second portion 12.

In the illustrated example, the first portion 11 and the second portion 12 each include a plurality of superimposed fibrous layers 111 or 121, each of which comprises ceramic particles. The ceramic particles may include particles of silicon carbide (SiC) or zirconia ($ZrO_2$). The average size D50 of the ceramic particles can be between 1 μm and 100 μm, for example between 1 μm and 20 μm.

The fibrous preform 1 further includes an intermediate portion 13 between the first 11 and second 12 portions. The intermediate portion 13 extends from the first portion 11 to the second portion 12. The first portion 11, the intermediate portion 13 and the second portion 12 can be offset along the thickness of the fibrous preform 1. The intermediate portion 13 can define the central part of the thickness of the fibrous preform 1. In the illustrated example, the intermediate portion 13 comprises a plurality of superimposed fibrous layers. The intermediate portion 13 is free of ceramic particles. The thickness $e_{13}$ of the intermediate portion 13 may be greater than the thickness of each of the first 11 and second 12 portions ($e_{11}$ and $e_{12}$), as illustrated. The thickness $e_{11}$ or $e_{12}$ of each of the first 11 and second 12 portions can be between 3% and 30%, for example between 15% and 20%, of the total thickness $e_1$ of the fibrous preform 1. The thickness $e_{13}$ of the intermediate portion 13 may be between 40% and 94%, for example between 60% and 70%, of the total thickness $e_1$ of the fibrous preform 1. Typically, the thickness $e_1$ may be between 5 mm and 40 mm. Each of the thicknesses $e_{11}$ and $e_{12}$ can be between 1 mm and 10 mm, for example between 1 mm and 8 mm. The thickness $e_{11}$ can be between 3 mm and 30 mm.

The mass content of ceramic particles in the fibrous preform 1 can be between 0.5% and 20%, for example between 1% and 5%.

FIG. 2 shows a discontinuous distribution of ceramic particles on the surface of the fibrous layers of the first portion 11. What will be described is applicable to the fibrous layers of the first portion 11 as well as to the fibrous layers of the second portion 12. In FIG. 2, the areas comprising the ceramic particles of a first fibrous layer are noted 112, those of a second fibrous layer superimposed on the first fibrous layer are noted 114 and those of a third fibrous layer superimposed on the first and second fibrous layers are noted 116.

Each fibrous layer alternates on its surface areas 112-116 comprising ceramic particles and areas 110 devoid of ceramic particles. In other words, we pass successively on the surface of each fibrous layer from an area 110 devoid of ceramic particles to an area 112-116 comprising ceramic particles, then again to an area 110 devoid of ceramic particles and so on. In each fibrous layer, areas 112-116 comprising ceramic particles may be offset along a circumferential direction DC of the fibrous layer. In each fibrous layer, the angular difference $\alpha_1$ between two consecutive areas 112-116 comprising ceramic particles measured along the circumferential direction DC can be between 5° and 60°, for example between 15° and 30°. In each fibrous layer, the areas 112-116 comprising ceramic particles may correspond by rotation about the center C of the fibrous layer. The areas 112-116 comprising ceramic particles may be evenly distributed over the surface of each fibrous layer, as illustrated. However, we do not depart from the scope of the present invention when this distribution is not regular. In each fibrous layer, the areas 112-116 comprising ceramic particles extend over a distance D, measured along a radial direction DR of the fibrous layer, greater than or equal to 50% of the radius RA of the fibrous layer. The radial direction DR of the fibrous layer connects the outer periphery of said layer to its center C. The radius RA of the fibrous layer corresponds to the difference between the large radius of the fibrous layer and its small radius. In an embodiment not illustrated, the ceramic particles are homogeneously distributed over the surface of the fibrous layers.

Further, FIG. 2 illustrates that the areas comprising the ceramic particles are offset when moving from a first fibrous layer to a second fibrous layer superimposed on the first fibrous layer. The areas 112-116 comprising ceramic particles do not overlap between two superimposed fibrous layers. The angular deviation $\alpha_2$ between the areas 112-116 comprising ceramic particles of two superimposed fibrous layers, measured along the circumferential direction DC, may be between 5° and 20°, for example between 10° and 15°. In an embodiment not illustrated, the areas comprising ceramic particles between different superimposed fibrous layers are superimposed.

The structure of an exemplary fibrous preform 1 according to the present invention has just been described. We will now describe the manufacturing process of this fibrous preform 1.

The needling of a woven helical fibrous web is known per se and the machines for carrying out this needling do not need to be further detailed here.

In order to obtain the fibrous preform 1 described above, the ceramic particles are distributed during the needling of the helical web, in a controlled manner so as to obtain the desired distribution for the ceramic particles. FIG. 3 thus illustrates a distribution system 20 allowing such distribution.

A fibrous layer 10 of the helical fibrous web is present on a needling table driven by a rotational movement materialized by the arrow R. The fibrous layer 10 belongs to the first part of the helical woven fibrous web which is intended to form the first portion 11. The fibrous layer 10 is needled by a needling head (not shown) comprising a plurality of barbed needles. During the needling of the fibrous layer 10, the distribution system 20 distributes ceramic particles on the fibrous layer 10. In the illustrated example, the distribution system 20 comprises a tank (not shown) containing a liquid medium comprising the ceramic particles to be distributed in suspension. The mass content of the ceramic particles in the liquid medium may be between 5% and 30%, for example being about 10%. This tank is in communication with a distribution nozzle 22 via the supply port 24.

The nozzle 22 is movable in translation relative to a stationary frame 28 carrying the distribution system 20. In the illustrated example, an actuator 26 sets the spray nozzle 22 in motion. The spray nozzle 22 is moved along the radial direction DR to the fibrous layer 10. During the needling of the fibrous layer 10, the spray nozzle 22 makes several back and forths along the radial direction DR while the fibrous layer 10 is driven by a rotational movement R around its center. The spray nozzle 22 can be movable between a first position located on the side of the outer periphery PE of the fibrous layer 10 and a second position located on the side of the inner periphery PI of the fibrous layer 10. During the rotation of the fibrous layer 10, the spray nozzle 22 may distribute the ceramic particles as it moves between the first position and the second position. The spray nozzle can then go back from the second position to the first position without distributing particles. After rotation of the fibrous layer 10 by a predetermined angle to obtain the desired angular deviation $\alpha_1$ (see FIG. 2), the distribution of the ceramic particles on the fibrous layer 10 is resumed in the same way: distribution between the first position and the second position then return from the second position to the first position without distributing particles. The processing is continued in this way for each of the superimposed fibrous layers which must comprise ceramic particles with an offset in the positions of the ceramic particles in the different superimposed layers if desired. This allows obtaining the distribution of ceramic particles shown in FIG. 2. Once the needling of the layers of the first part of the web completed, the distribution of ceramic particles is interrupted and the layers of the intermediate part of the web are needled without distributing the ceramic particles. Once this needling completed, the distribution of the ceramic particles is resumed during the needling of the second portion of the helical web. The distribution of the ceramic particles in the second part of the web is carried out in a similar manner to what was described above for the first part of the web.

The distribution system 20 is controlled by a control unit which determines the back and forth frequency as well as the speed of movement of the distribution system 20 based on other process parameters so as to achieve the desired distribution of the ceramic particles. Alternatively, the actuator may be replaced by a stepper motor, which allows the speed of advance of the spray nozzle 22 to be varied and improves the accurate movement of the nozzle 22.

The case where the ceramic particles are deposited on the fibrous layer by spraying a suspension of these particles in a liquid medium has been described, but alternatively the ceramic particles could be sprayed dry without a liquid medium. For example, a 60 mm thick brake disc preform was made comprising 40 layers of woven carbon fibers. On each side of the disc, 8 layers were covered with ceramic particles (i.e. on 40% of the preform thickness). Each layer was about 1.5 mm thick, corresponding to a total thickness of about 12 mm including the ceramic particles on each side of the disc. The application of the ceramic particles does not take place over the entire surface of the layers but by respecting an alternation between areas comprising solely of carbon fibers and areas comprising a mixture of carbon fibers and ceramic particles, as shown in FIG. 2. The application of the ceramic particles was carried out with a 30° phase shift within the same layer and a 10° phase shift from one layer to another.

The friction part can then be obtained by densifying the porosity of the preform with a matrix. The densification step is a per se known step. The matrix can comprise a pyrocarbon matrix phase, obtained by Chemical Vapor Infiltration ("CVI") or by Polymer Impregnation and Pyrolysis ("PIP").

FIG. 4 illustrates the stabilization of the cold friction coefficient in the case of a disc comprising a fibrous reinforcement formed by a preform as described above. The disc was subjected to a test cycle comprising a plurality of successive cold braking operations simulating the stresses on the disc when the brake is put into operation (cold, $1^{st}$ track lap) for a racing car application (curve "A"). The performances of the disc according to the present invention was compared with those obtained for a disc not comprising ceramic particles (curve "B"). It can be seen that, as the braking is carried out, which corresponds to cold operation, the coefficient of friction obtained for the disc according to the present invention is more stable than the one obtained for the reference disc. FIG. 5 illustrates the similarity of the coefficients of friction at high energy between the disc according to the present invention ("loaded disc") and the reference disc ("reference").

The expression "comprised between . . . and . . . " should be understood as including the terminals.

The invention claimed is:

1. A fibrous preform for forming a fibrous reinforcement of a friction part made of composite material, comprising a woven helical fibrous texture defining a superposition of fibrous layers, said texture being needled and defining:

a first portion and a second portion each intended to define a distinct rubbing face of the friction part and each comprising at least one fibrous layer comprising ceramic particles, the ceramic particles are discontinuously present on a surface of the fibrous layers of the first and second portions with an alternation along a circumferential direction of the fibrous layers between areas comprising the ceramic particles and areas devoid of ceramic particles at the rubbing faces, fibers of the fibrous layers of the first and second portions being present into the areas devoid of ceramic particles, and an intermediate portion between the first portion and the second portion and comprising at least one fibrous layer, said intermediate portion being devoid of ceramic particles, wherein the first and second portions each comprise a first fibrous layer having first areas in which the ceramic particles are present, and a second fibrous layer, superimposed on the first fibrous layer, having second areas in which the ceramic particles are present, the second areas not covering the first areas, and wherein the second fibrous layer comprises additional areas devoid of ceramic particles with an alternation along the circumferential direction between the second areas and said additional areas, and wherein, in said alternation, the first areas of the first fibrous layer in which the ceramic particles are present are superimposed with the additional areas of the second fibrous layer that are devoid of ceramic particles.

2. The fibrous preform according to claim 1, wherein the ceramic particles are present in areas extending along a radial direction of the fibrous layers of the first and second portions.

3. The friction part made of composite material comprising a fibrous preform according to claim 1, and a matrix present in the porosity of the fibrous preform.

4. The friction part according to claim 3, wherein the friction part is a brake disc.

5. The fibrous preform according to claim 1, wherein the first and second portions each comprise a third fibrous layer, superimposed on the first and second fibrous layers, having third areas in which the ceramic particles are present, the third areas not covering the first and second areas, and wherein the third fibrous layer comprises supplemental areas devoid of ceramic particles with an alternation along the circumferential direction between the third areas and said supplemental areas.

6. The fibrous preform according to claim 1, wherein the areas devoid of ceramic particles comprise solely fibers from the fibrous layers of the first and second portions.

7. A manufacturing method of a fibrous preform according to claim 1, comprising:

needling a first part of a woven helical fibrous web to form the first portion of the fibrous texture, wherein ceramic particles are distributed on said first part during said needling, needling an intermediate part of the woven helical fibrous web to form the intermediate portion of the fibrous texture, said intermediate part being superimposed on the first part and the distribution of the ceramic particles being interrupted during said needling, and needling a second part of the woven helical fibrous web to form the second portion of the fibrous texture, said second part being superimposed on the intermediate part and ceramic particles being distributed on said second part during said needling, the ceramic particles being discontinuously distributed on a surface of the fibrous layers of the first and second portions of the woven helical fibrous web with an alternation along the circumferential direction of the fibrous layers between areas comprising the ceramic particles and areas devoid of ceramic particles at the rubbing faces, wherein when needling each of the first and second portions of the woven helical fibrous web, the following is carried out:

needling the first fibrous layer during which ceramic particles are discontinuously deposited in the first areas on the surface of the first fibrous layer, and needling the second fibrous layer, superimposed on the first fibrous layer, during which the ceramic particles are discontinuously deposited in the second areas on the surface of the second fibrous layer, the second areas not covering the first areas, wherein the second fibrous layer comprises the additional areas devoid of ceramic particles with the alternation along the circumferential direction between the second areas and said additional areas, and wherein, in said alternation, the first areas of the first fibrous layer in which the ceramic particles are present are superimposed with the additional areas of the second fibrous layer that are devoid of ceramic particles.

8. The method according to claim 7, wherein the ceramic particles are distributed by a distribution system moving along a radial direction of the fibrous layers of the first and second portions.

* * * * *